Patented Apr. 7, 1953

2,634,258

UNITED STATES PATENT OFFICE 2,634,258

PROCESS FOR THE POLYMERIZATION OF UNSATURATED ORGANIC MATERIALS

William D. Stewart, Brecksville, Ohio, assignor to The B. F. Goodrich Company, New York, N. Y., a corporation of New York No Drawing. Application July 14, 1950, Serial No. 173,937

4 Claims. (Cl. 260—84.1)

The present invention relates generally to the polymerization of unsaturated organic compounds which by reason of containing the vinylidene $CH_2=C<$ structure, are capable of undergoing addition polymerization to produce high molecular weight, predominantly linear polymers and more particularly to the polymerization in aqueous emulsion in the presence of improved redox catalysts of conjugated dienes and mixtures thereof with vinyl and vinylidene compounds such as styrene, acrylonitrile, alkyl acrylates, vinylidene chloride, and the like.

It is well known that the addition polymerization of various polymerizable vinylidene compounds, particularly the butadiene-1,3-hydrocarbons, may be promoted by oxygen and oxygen-yielding substances such as benzoyl peroxide and the like. It is also known that the combination of an oxidant with a reducing agent to form a redox catalyst, with or without an activating heavy metal salt, produces very rapid rates of polymerization. For example, the combination of cumene hydroperoxide, ferrous ammonium sulfate, potassium pyrophosphate, and a sugar is commonly utilized in the production of so-called "cold rubber" in polymerizations conducted at −10 to 30°.

Due to the advantageous properties of polymers, particularly the rubbery polymers of butadiene-1,3 hydrocarbons, produced at low temperatures of −30 to 30° C., it has become increasingly important that better low temperature redox catalysts be developed. The known redox catalyst systems have numerous drawbacks, for example, the redox catalysts using heavy metal salts and reducing sugars do not produce as high a reaction rate as is desirable and have such poor storage stability that they must be used soon after preparation. In addition, they require complicated preparation procedures including aging or heat treatment steps in order to acquire maximum catalytic effect. Moreover, some of the ingredients, for example a sugar, serve as metabolities for a host of microorganisms with the result that mold formation and fermentation takes place on processing equipment and in the latex during storage. Lastly, but not least, the redox catalysts heretofore in use are exceedingly sensitive to minor variations in their method of preparation and to minor variations in monomer purity, with consequent slow reaction rates.

I have discovered that unsaturated organic materials broadly classifiable as vinylidene compounds having the structure $CH_2=C<$ and preferably monomeric mixtures of butadiene-1,3 hydrocarbons with mono-olefinic monomers such as styrene, acrylonitrile, and others may be rapidly and efficiently polymerized in an aqueous medium in the presence of a catalyst system comprising an oxidant and a ferrous salt of a sugar acid (i. e. a monocarboxy polyhydroxy acid) containing from 4 to 7 carbon atoms and from 3 to 6 hydroxy groups (exclusive of the OH group occurring in the carboxy group). The resultant oxidation-reduction type of catalyst is greatly superior to known redox catalyst combinations in that polymerization is carried out in a much shorter interval of time, lower temperatures may be employed, and the components of the catalyst may simply be dissolved in water and used in the polymerization of monomers of variable purity without aging or heat-treatment and without substantial variation in reaction rate.

The oxidant utilized in connection with the ferrous salt may be any of the oxygen-yielding substances or peroxygen compounds commonly employed in the polymerization of unsaturated organic compounds including the per-compounds among which are the organic peroxides such as benzoyl peroxide, cumene hydroperoxide and others and the inorganic per-compounds such as the potassium, sodium and ammonium persulfates, perphosphates, percarbonates and others. I have discovered however, that the chloro-substituted benzoyl diperoxides are greatly superior because the reaction rate in their presence is linear with respect to time up to about 80% conversion. Other useful organic peroxides include the alkaryl monohydroperoxides such as cumene hydroperoxide, diisopropylbenzene monohydroperoxide, and others. In the presence of chlorobenzoyl peroxides such as o-, m- or p-chlorobenzoyl peroxide, 2,4-dichlorobenzoyl peroxide, 2,5-dichlorobenzoyl peroxide, 2,6 - dichlorobenzoyl peroxide, 2,4,6 - trichlorobenzoyl peroxide and others the overall reaction rate is often of the order of 20%/hour while with the sugar-iron-oxidant of the prior art the reaction rate is of the order of 2 to 5% per hour.

The ferrous salt utilized as the reductant in the redox system of this invention may be the ferrous salt of 2,3,4-trihydroxy butyric acid, ferrous arabonate, ferrous gluconate (preferred), ferrous glucuronate, ferrous mannate, ferrous galacturonate, ferrous galactonate, ferrous mannuronate, ferrous glucoheptonate and others. Ferrous gluconate because of its ready availability, low cost, and its great catalytic activity is the material of this class which is greatly preferred. The ferrous salts of this class are possessed of sufficient solubility in water as to expedite their use yet unlike the separate addition of inorganic iron salts as in conventional processes, they do not become completely oxidized at once but seem to have the property of gradually giving up iron to the oxidation reduction reaction thereby maintaining maximum catalytic activity until about 80% of the monomeric mixture has been converted to polymer.

The new catalyst combination of this invention is applicable generally to the polymerization of unsaturated organic compounds which contain the $CH_2=C<$ group, that is vinylidene compounds and compounds containing a terminal methylene group attached by a double bond to a carbon atom which undergo addition polymerization to produce predominantly linear polymers. Examples of such compounds include the conjugated open-chain dienes such as the butadiene-1,3 hydrocarbons including butadiene-1,3, isoprene, 2,3-dimethyl butadiene-1,3, and others, chloroprene, 3-cyano butadiene-1,3, piperylene and others; trienes such as myrcene and others; mixtures of the above dienes with vinyl and vinylidene compounds such as vinylidene chloride, styrene, p-chlorostyrene, 3,5-dichlorostyrene, p-methoxystyrene, acrylic and alpha-alkyl acrylic acids, their esters, nitriles and amides such as acrylic acid, methacrylic acid, methyl acrylate, octyl acrylate, methyl methacrylate, lauryl methacrylate, acrylonitrile, alpha-chloro acrylonitrile, methacrylonitrile, dimethyl acrylamide, and others, vinyl pyridine, vinyl benzoate, vinyl ketones and vinyl ethers, vinyl carbazole, vinyl furane, and others, and compounds copolymerizable with the dienes such as isobutylene, diallyl maleate, 1,4-divinyl benzene, and others; compounds containing both olefinic and acetylenic bonds such as vinyl acetylene, vinyl ethynyl carbinol, and the like, and others; and vinylidene compounds containing only one carbon to carbon double bond such as the vinyl compounds including vinyl chloride, vinylidene chloride, styrene, p-chlorostyrene, 3,5-dichlorostyrene, p-methoxy styrene, acrylonitrile, methacrylonitrile, alpha-chloro acrylonitrile, methyl acrylate, ethyl acrylate, methyl methacrylate, butyl ethacrylate, dimethyl acrylamide, vinyl methyl ketone, vinyl methyl ether, vinyl pyridine, vinyl acetate, vinyl propionate, vinyl benzoate and others, and isobutylene, ethylene, and other monoolefinic polymerizable compounds. The above vinylidene compounds may be copolymerized with one another or with still other unsaturated polymerizable materials such as diethyl maleate, diethyl fumarate, maleic acid or anhydride, and others.

It will be understood from the above examples that vinyl compounds are a sub-genus of vinylidene compounds since they contain the characteristic $CH_2=C<$ structure, one of the free valences being connected to hydrogen to form the vinyl

group.

In the practice of the method of this invention monomeric compounds or mixtures of monomers are polymerized by well known methods of polymerization as by polymerization in aqueous emulsion. In the emulsion polymerization process a soap solution is prepared, the reductant and other water-soluble salts added thereto and the reaction vessel sealed. The monomeric materials, modifiers and other oil-soluble ingredients such as the oxidant are then added, the temperature adjusted, and agitation supplied in order to form an emulsion. The resulting dispersion containing polymer particles dispersed in a liquid medium may be coagulated in the usual manner to yield the solid polymer.

The amount of the redox combination to be utilized in polymerization may be varied over rather wide limits. In general from as little as 0.01% each of reductant and oxidant to as much as 2% or more based on the total monomeric materials may be utilized. However, the ratio of the reductant to the oxidant has a more profound influence on reaction rate than the amount utilized. In general more of the reductant than oxidant should be utilized. Specifically, when utilizing ferrous gluconate as the reductant and a chlorobenzoyl peroxide as the oxidant the reductant/oxidant ratio may vary from 1/2 to 6/1 or more. The optimum reductant/oxidant ratio varies slightly for each amount of reductant, for example, when utilizing 2.0 millimoles of ferrous gluconate per 100 parts of monomers the optimum ferrous gluconate/oxidant ratio is 1.67/1.0 and when as little as 0.25 millimoles of ferrous gluconate is utilized the optimum ratio is 3.10/1.0.

The redox system of this invention may be used in emulsions prepared with various emulsifying agents including the fatty acid soaps such as potassium oleate, potassium myristate, sodium palmitate, and the like, the ammonium and alkanolamine soaps of the fatty acids, the rosin acid, the disproportionated rosin acid and hydrogenated rosin acid soaps, and the synthetic saponaceous materials including the hymolal sulfates and alkaryl sulfonates such as sodium lauryl sulfate, the sodium salts of the sulfonated petroleum oil fractions, sodium isobutyl naphthalene sulfonate, sodium salts of polymerized alkaryl sulfonic acids, sodium salts of the sulfonated dicarboxylic acid esters and amides such as sodium dioctyl sulfosuccinate, N-octadecyl-1,2-dicarboxyethyl sulfosuccinamate, the salts of high molecular weight amines such as dodecylamine hydrochloride and the like, and others. However, as will be demonstrated later herein, the rosin acid soaps low in unsaturation favor faster reactions of the preferred diene monomers yet produce polymers of highly advantageous properties and hence, it is preferred to utilize a saturated rosin acid soap or mixture of saturated rosin acid soap and a fatty acid soap in the emulsion when utilizing the redox catalyst combination of this invention.

Likewise, as is well understood in the art, it is preferred to polymerize the butadiene-1,3 hydrocarbons, their mixtures with vinyl and vinylidene compounds, and the alkyl acrylates and their mixtures with other vinyl compounds in the presence of a polymerization modifier such as any of the aliphatic mercaptans containing from 4 to 16 carbon atoms. The tertiary alkyl mercaptans containing from 10 to 14 carbon atoms are particularly preferred. The amount of the modifier utilized will depend on the type of polymer desired. However, in the production of synthetic rubbery materials it now appears preferable to prepare them in the undermodified condition and terminate the reaction when only 50 to 70% of the monomeric materials have been converted to polymer. Amounts varying from 0.1 to 1.0% will usually suffice for the latter purpose.

It is also conventional practice, especially in polymerizations conducted at temperatures below 30° C., to add an electrolyte to the polymerization medium to reduce the viscosity of the medium and thereby improve agitation and heat transfer during polymerization. Illustrative materials useful for this purpose include the alkali metal chlorides, sulfates, sulfites, phosphates, carbonates, borates, citrates, tartrates, oxalates and others. The alkali metal ion appears to be the active agent and the anion appears to have little effect. Potassium ion is the most active alkali metal ion so that such materials as potassium chloride, potassium sulfate, potassium sulfite, potassium bisulfite, potassium phosphate and others are greatly preferred for this purpose.

The hydrogen ion concentration of the reaction medium may be varied somewhat as is well understood by the art. In general, the pH may be varied from as low as 3.0 to as high as 11.5. Since reaction rates are much higher with most monomeric materials under alkaline conditions it is generally preferred to carry out the polymerization in a medium having a pH of from 9.5 to 11.5. Best results are obtained at a pH of 10.5 to 11.3.

The redox catalyst of this invention responds with greater activity when used in an aqueous medium containing very small amounts of heavy metal salts although without these salts the use of the redox system of this invention results in polymerizations complete in a very short interval of time. Specifically such salts as cobalt chloride, cuprous chloride, ferrous ammonium sulfate, potassium chromate, manganous sulfate, and the like are utilizable in amounts up to 0.5 to 1.0% or less. Usually amounts of 0.0001 to 0.1% of the more active cobalt, copper, and manganese salts will be found sufficient.

The invention will now be more fully explained with reference to the following specific examples which are intended to be illustrative only and not as limitations on the scope of the invention.

*Example I*

A copolymer of butadiene-1,3 and styrene is prepared in two different systems, one (A) the preferred system of this invention and the other (B) a well-known iron-activated sugar-oxidant combination. The reaction mixtures are as follows:

| Material | Recipe A | Recipe B |
| --- | --- | --- |
| Butadiene-1,3 | 72 | 72 |
| Styrene | 28 | 28 |
| Emulsifier | [1] 2.50 | [2] 4.5 |
| t-dodecyl mercaptan | 0.25 | 0.25 |
| Oxidant | [3] 0.30 | [4] 0.10 |
| Ferrous gluconate | 0.50 | |
| Dextrose | | 1.0 |
| KCl | 0.50 | 0.50 |
| $K_4P_2O_7 \cdot 3H_2O$ | | 0.150 |
| KOH | 0.10 | 0.10 |
| $FeSO_4 \cdot 7H_2O$ | | 0.10 |
| Water | 180 | 175.0 |

[1] The potassium salt of a completely hydrogenated rosin acid—100% neutralized.
[2] Potassium fatty acid soap.
[3] p-Chlorobenzoyl peroxide.
[4] Cumene hydroperoxide.

The water and soap in the form of a cool solution are charged to the reaction vessel, and the potassium hydroxide, salt, and reductant (ferrous gluconate or dextrose) dissolved therein. The contents of the vessel is then blanketed with nitrogen, the mercaptan in an aliquot of styrene added thereto and finally the butadiene added. The vessel is then sealed and the oxidant dissolved in the remainder of the styrene is injected into the vessel. The vessel and its contents are brought to a temperature of 5° C. and agitation is commenced. Recipe A reacts smoothly in four hours at 5° C. to convert 86% of the monomeric mixture to polymer. Recipe B reacts to a conversion of 33% in 24 hours. Recipe A containing the ferrous gluconate chlorobenzoyl peroxide redox combination thus has a reaction rate of over 20%/hour while recipe B has a reaction rate of less than 2%/hour.

*Example II*

A rate study is made by taking small samples of latex during polymerization for total solids determination. The recipes compared are recipe B of Example I and a recipe similar to recipe A of Example I except for the substitution of diisopropylbenzene monohydroperoxide for the chlorobenzoyl peroxide. The results are as follows:

| Recipe A | | Recipe B | |
| --- | --- | --- | --- |
| Time (Hr.) | Conversion, Percent | Time (Hr.) | Conversion, Percent |
| 2 | 21.0 | 2 | 15.1 |
| 5 | 46.5 | 5 | 24.3 |
| 8 | 66.6 | 8 | 31.0 |
| 10 | 74.3 | 10 | 36.1 |
| 18 | 86.0 | 18 | 50.0 |

In this example it is apparent that the catalyst combination of recipe A favors faster reactions than does the sugar-oxidant-iron combination of recipe B.

*Example III*

The clear superiority of highly saturated potassium rosin acid soaps is demonstrated when the polymerization of Example I is repeated varying the type of soap used. The results are as follows:

| Soap | 4-Hour Conversion, Percent | 8-Hour Conversion, Percent |
| --- | --- | --- |
| (1) | 70.1 | 84.5 |
| (2) | 31.3 | 48.2 |
| (3) | [1] 25.8 | 37.2 |
| (4) | [1] 24.9 | 48.4 |

[1] 5-hour conversion.
(1) The potassium salt of a completely hydrogenated rosin acid soap.
(2) Potassium fatty acid soap.
(3) Potassium soap of disproportionated rosin acid.
(4) Sodium soap of disproportionated rosin acid.

It is clear that the saturated soaps are clearly superior in polymerizations utilizing the redox catalyst of this invention.

*Example IV*

Variation in reaction rate is observed when the type and amount of oxidant is varied in the recipe (A) of Example I. The following are the results when 1.0 millimole per 100 parts of monomers of ferrous gluconate reductant is utilized:

| Oxidant | Millimoles | Percent Conversion—4 Hour |
|---|---|---|
| p-chlorobenzoyl peroxide | 0.5 | .62 |
| Do | 0.6 | 72 |
| Do | 0.7 | 72 |
| Do | 1.0 | 59 |
| o-chlorobenzoyl peroxide | 0.5 | 45 |
| Do | 0.6 | 55 |
| Do | 0.7 | 40 |
| Do | 1.0 | 26 |
| m-chlorobenzoyl peroxide | 0.5 | 74 |
| Do | 0.6 | 79 |
| Do | 0.7 | 77 |
| Do | 1.0 | 67 |
| 2,4-dichlorobenzoyl peroxide | 0.4 | 37 |
| Do | 0.6 | 53 |
| Do | 0.8 | 63 |
| Do | 0.9 | 66 |
| Do | 1.35 | 68 |

From the above and other experiments it is easily determined that for each level of ferrous gluconate and for each oxidant there is an optimum gluconate/oxidant ratio as follows:

| Oxidant | Gluconate Level, millimoles | Reductant/oxidant Mole Ratio |
|---|---|---|
| p-chlorobenzoyl peroxide | 2.0 | 1.67/1.0 |
| Do | 1.0 | 1.67/1.0 |
| Do | 0.5 | 2.50/1.0 |
| Do | 0.25 | 3.10/1.0 |
| 2,4-dichlorobenzoyl peroxide | 2.0 | 1.43/1.0 |
| Do | 1.0 | 1.25/1.0 |
| Do | 0.5 | 1.25/1.0 |
| Do | 0.25 | 1.25/1.0 |

*Example V*

The combination of ferrous gluconate and p-chlorobenzoyl peroxide in a methanol-water (¼) medium and utilizing potassium oleate emulsifier at −10° C. effects the polymerization of monomeric mixtures consisting of, respectively, 67% by weight of butadiene-1,3 and 33% by weight of acrylonitrile and 67% by weight of butadiene-1,3, 17% by weight of acrylonitrile and 16% by weight of styrene in 24 to 30 hours at −10° C.

*Example VI*

Mixtures of ethyl acrylate and acrylic acid are polymerized in an aqueous medium having the following composition:

| Material | Parts/Wt. |
|---|---|
| Ethyl Acrylate } to total | 100.0 |
| Acrylic Acid | |
| Dodecylamine Hydrochloride [1] | 3.0 |
| Ferrous gluconate | 0.02 |
| t-dodecyl mercaptan | 0.10 |
| Potassium persulfate | 0.10 |
| Water | 150.00 |

[1] Amine 100% neutralized by HCl. Initial pH about 4.0.

The procedure is the same as in Example I. The reaction temperature is 40° C. Mixtures containing from 85 to 95% ethyl acrylate and from 5 to 15% acrylic acid are completely polymerized in one-half hour of reaction. The "induction" period was very short, varying from as little as 10 minutes to as much as 70 minutes. By contrast, when similar mixtures are polymerized in the presence of only potassium persulfate as the sole catalyst long induction periods of from 2½ to 6.0 hours are encountered and from 2 to 6 hours are required for complete reaction. Similar results are obtained when methacrylic acid or beta-vinyl acrylic acid are substituted for acrylic acid and other alkyl acrylates are utilized in place of ethyl acrylate.

Ethyl acrylate polymerized alone in the medium of Example VI is completely reacted in 108 minutes at 40° C.

*Example VII*

Acrylonitrile is polymerized to polyacrylonitrile in aqueous emulsion at 5° C. in the presence of cumene hydroperoxide and ferrous gluconate at a reaction rate approximately 10 times that obtainable with the sugar-iron system of recipe B in Example I.

*Example VIII*

Vinyl chloride is converted to high molecular weight polyvinyl chloride in aqueous emulsion at 5° C. utilizing diisopropylbenzene monohydroperoxide and ferrous gluconate at a rate approximately 6 times that obtainable with the sugar-iron combination shown in recipe B, Example I.

Similar results are obtained when ferrous arabonate, ferrous glucuronate, ferrous mannate, ferrous galacturonate, ferrous glucoheptonate and other similar compounds are substituted for ferrous gluconate in the foregoing examples.

Although various embodiments of the invention have been herein disclosed, it is not intended that the invention be limited solely thereto for it will be obvious to those skilled in the art that many modifications and variations are within the spirit and scope of the invention as defined by the appended claims.

I claim:
1. The process which comprises polymerizing a monomeric material comprising a butadiene-1,3 hydrocarbon in aqueous emulsion at a pH of 9.5 to 11.5 and a temperature from −30 to +30° C. in the presence of a catalyst consisting of 0.01 to about 2.0 percent of ferrous gluconate reductant and 0.10 to 2.0 percent of an organic peroxide oxidant, said reductant and oxidant being in a ratio of from 1 reductant:2 oxidant to about 6 reductant:1 oxidant, said percents being based on the weight of the monomeric material.
2. The process of claim 1 wherein the organic peroxide is an alkaryl hydroperoxide.
3. The process of claim 1 wherein the organic peroxide is a chlorobenzoyl diperoxide.
4. The process which comprises polymerizing a monomeric mixture consisting essentially of butadiene-1,3 and styrene in aqueous emulsion at a pH of about 11 and a temperature of about 5° C. in the presence of a catalyst consisting of about 2.0 percent of ferrous gluconate and about .5 percent of diisopropylbenzene monohydroperoxide, said percents being based on the weight of the monomeric mixture.

WILLIAM D. STEWART.

REFERENCES CITED

The following references are of record in the file of this patent:

UNITED STATES PATENTS

| Number | Name | Date |
|---|---|---|
| 2,234,076 | Gumlich et al. | Mar. 4, 1941 |
| 2,380,474 | Stewart | July 31, 1945 |

OTHER REFERENCES

Mitchell et al., Ind. and Eng. Chem., vol. 41, No. 8, August 1949, pp. 1592–1598.

Marvel et al., Jour. Polymer Science, vol. 3, 1948, page 434.